United States Patent [19]
Engle et al.

[11] 3,895,850
[45] July 22, 1975

[54] ELECTROPNEUMATIC TRAINLINE CONNECTOR

[75] Inventors: Thomas H. Engle, Cape Vincent; Glen O. Bohusch, Watertown; Thomas M. Bogenschutz, Clayton, all of N.Y.

[73] Assignee: General Signal Corporation, Rochester, N.Y.

[22] Filed: Nov. 9, 1973

[21] Appl. No.: 414,461

[52] U.S. Cl. .................... 339/15; 303/15; 339/45 R; 339/48; 339/117 P
[51] Int. Cl. .............................................. H01r 3/04
[58] Field of Search ..... 339/15, 16 R, 16 RC, 45 R, 339/47 R, 48, 117 R, 117 P; 303/15, 75

[56] References Cited
UNITED STATES PATENTS
1,750,633  3/1930  Farmer .................................. 339/15
3,545,816  12/1970  Engle .................................. 303/15

*Primary Examiner*—Roy Lake
*Assistant Examiner*—DeWalden W. Jones
*Attorney, Agent, or Firm*—Pollock, Philpitt & Vande Sande

[57] ABSTRACT

An Electropneumatic train line connector using the train line brake pipe is disclosed. The connector is for use in communicating control signals or the like to train cars equipped with a conventional airbrake system, that is, a train line brake pipe, and interconnections between train cars through angle cocks, pneumatic hoses and "gladhands". The connector makes possible an electrical circuit which passes through the angle cocks, hoses and gladhands between each car. A return path is provided through the rails and the interconnected metal portions of the cars. Means are provided to insure electrical contact is made before the pneumatic connection is secured.

10 Claims, 8 Drawing Figures

PATENTED JUL 22 1975

3,895,850

SHEET 1

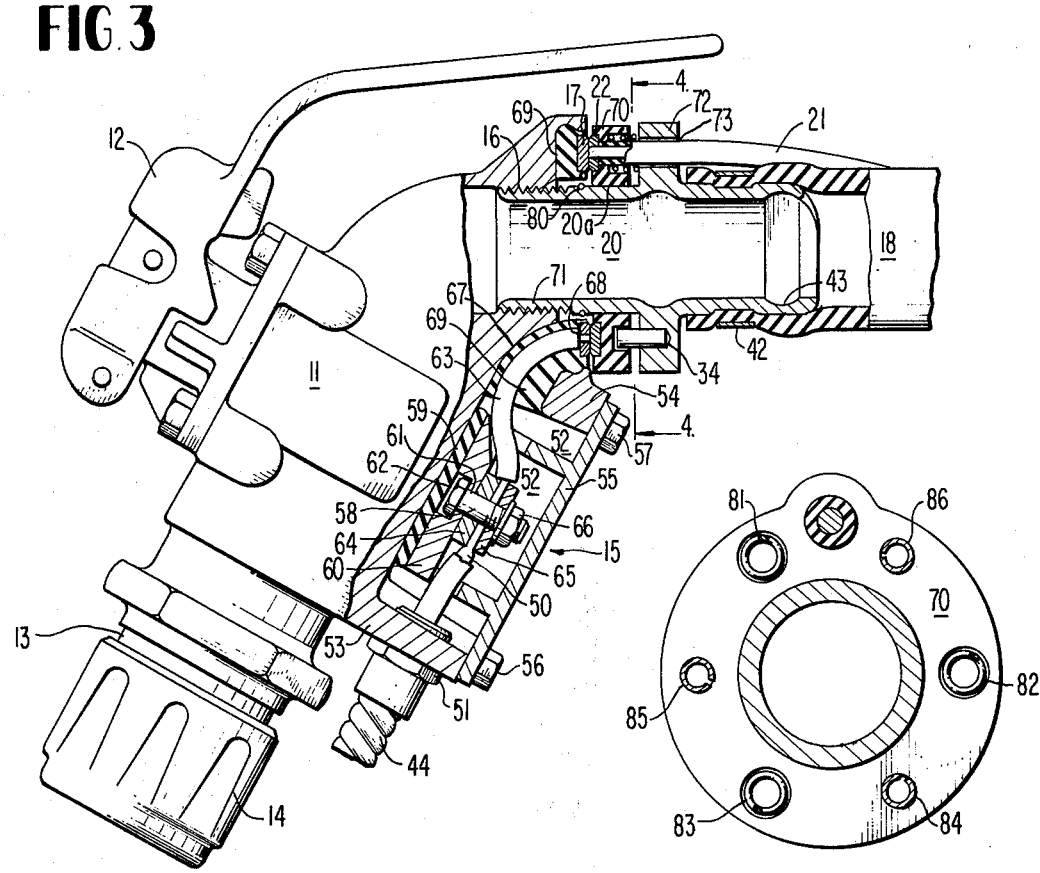
FIG. 3
FIG. 4
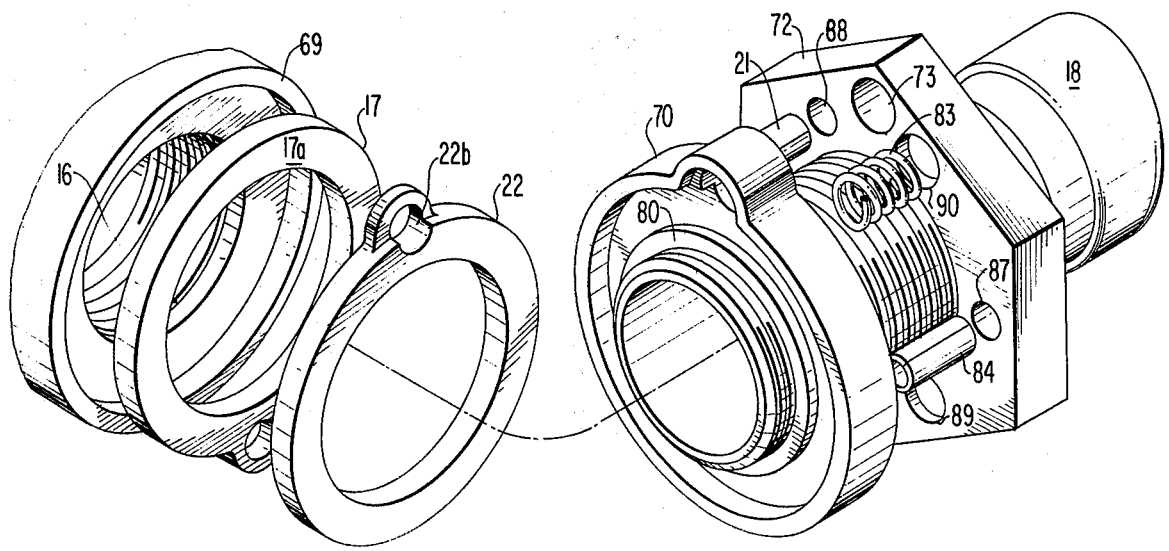
FIG. 5

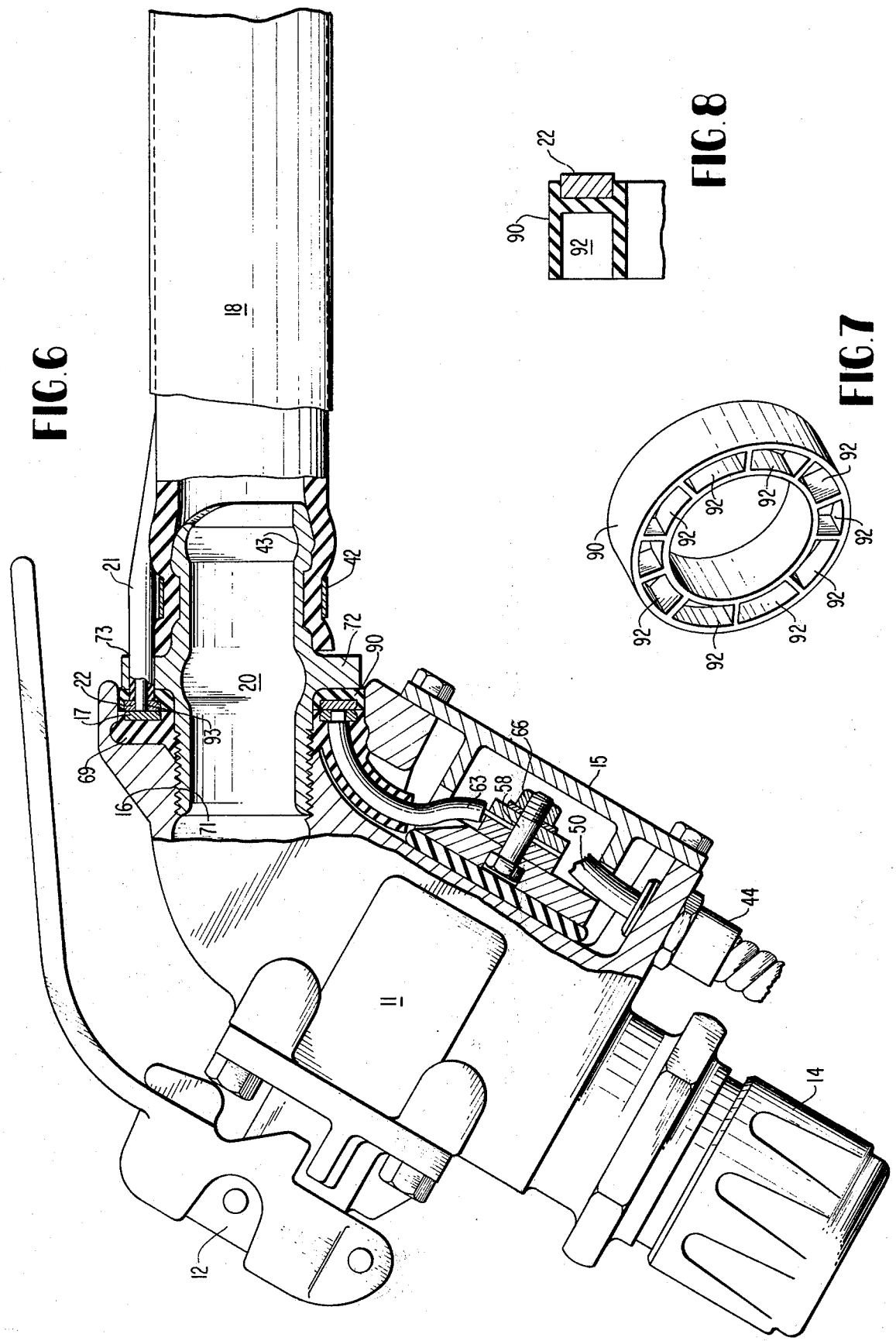

ELECTROPNEUMATIC TRAINLINE CONNECTOR

BACKGROUND OF THE INVENTION

For many years, the automatic air brake has been the standard service brake employed by the railroad industry. Although this type of brake has proved satisfactory, it has certain undesirable characteristics. The chief disadvantage is slow response, but the inability to effect graduated applications, to simultaneously operate the brakes on all cars, and to change the auxiliary reservoirs while the brakes are applied also impose limitations on train operation. It has long been recognized that the braking performance could be improved by using an electrically-operated circuit to assist the air brake. Such a circuit for an electrically-assisted automatic air brake for trains is disclosed in U.S. Pat. No. 3,545,816, the disclosure of which is incorporated herein by reference.

The electrical circuit employed herein uses a single train line control wire which uses the gladhands or hose couplers between the brake pipes to interconnect the brake pipes between cars. The return path for the circuitry relies upon the metal rails, the wheels, the car bodies and the couplers. The return path also serves as the ground path for the circuitry. Since servicing of the constituent parts of the vehicle is often done by mechanics having minimal skill in the art, it is desirable to insure the electrical interconnection between cars is made as foolproof as possible.

SUMMARY OF THE INVENTION

The present invention is intended to provide an electropneumatic train line communications connection between each of the individual cars in the train. It utilizes components already employed in the pneumatic brake pipe, and the components used in the pneumatic interconnections between the train car brake pipes. The present invention employs a modified brake pipe angle cock at each end of the brake pipe interconnection between the cars. A first electrical contact means is mounted on and insulated from the angle cock. A second, and resiliently biased contact means is mounted on the brake pipe hose which extends outwardly from each angle cock. A conductor means traverses the length of the brake pipe hose and insures electrical interconnection between the first and second electrical contacts and the gladhand or pneumatic coupler. When two gladhands are joined, as is necessary in establishing the pneumatic train line brake pipe, they automatically form the electrical interconnection for the train line communication system. The return path uses both the communication between car bodies afforded by the couplers, and the communication path afforded by the car bodies, wheels, and rails. These two systems together lower the impedance of the return path enough to make the train line commuication system feasible for use in freight trains.

It is another object of the present invention to provide a foolproof and trouble-free service connection for the electrical train line communication system that will withstand the rigors of extended service life without repair or maintenance. A standard angle cock is modified to provide a junction box therein. The junction box is used to interconnect the trainline communication signal wire with the electropneumatic connector. Means are also provided to insure that a positive electrical connection is made when the pneumatic hoses are replaced. Resilient means are provided to insure that electrical contact is made before the pneumatic connection is secured. Two separate resilient means are disclosed for urging two rotary contacts into face-to-face abutment with one another as the threaded connection is made up.

BRIEF DESCRIPTION OF THE DRAWINGS

FIG. 3 is a diagrammatic and partially cross-sectioned view of the angle cock and the preferred embodiment of the electropneumatic connector of the present invention.

FIG. 4 is a cross-sectional view taken along section lines 4—4 of FIG. 3.

FIG. 5 is an exploded and isometric view of the preferred embodiment of the present invention.

FIG. 6 is a diagrammatic and partially cross-sectioned view of an alternate embodiment of the present invention.

FIG. 7 is an isometric view of the resilient means used in the alternate embodiment of the present invention.

FIG. 8 is a cross-sectional view of the resilient means illustrated in FIG. 7.

DETAILED DESCRIPTION OF THE PREFERRED EMBODIMENTS

Figure 1:
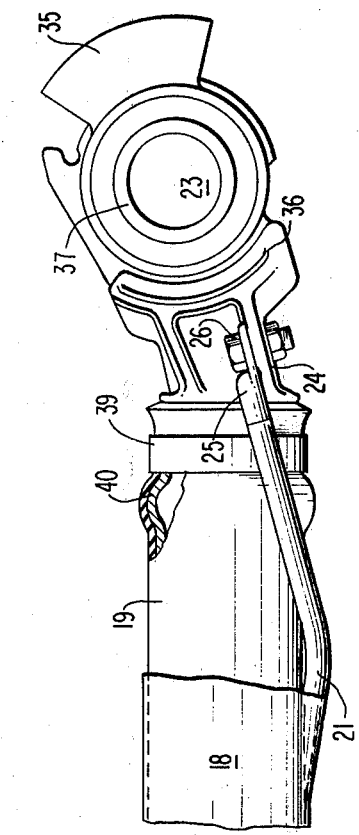
FIG. 1 is a diagrammatic and partially crosssectioned view of an angle cock, pneumatic hose and gladhand constructed in accordance with the present invention.

FIG. 1 is a diagrammatic and partially cross-sectioned view of an angle cock, pneumatic hose and gladhand constructed in accordance with the preferred embodiment of the invention. The angle cock 11 includes a shut-off valve 12, a brake pipe connecting portion 13 (covered in FIG. 1 by a protective cap 14), a junction box 15, a threaded female portion 16, and a first electrical contact means 17. Electrical contact means 17 will be described with respect to FIGS. 3–5.

The pneumatic coupling hose 18 includes a nonconductive hose portion 19, a threaded male adapter 20, a conductor 21, and a second electrical contact means 22. Electrical contact means 22 will be described with respect to FIGS. 3–5.

FIG. 1 also discloses a metal pneumatic coupler 23 or gladhand which mates with an identical gladhand to form the pneumatic interconnection between a pair of train cars equipped with angle cocks and hoses similar to hose 18. The conductor means 21 is securely fastened to the metallic pneumatic coupler 23 as indicated at 24 by means of lug 25 and bolt 26. It is apparent that a variety of different conductors 21 could be used to electrically interconnect gladhand 23 with the second electrical contact 22. In the preferred embodiment, conductor 21 is formed of a stranded and insulated wire which is taped, banded or otherwise secured to the exterior of pneumatic hose 18.

Figure 2:
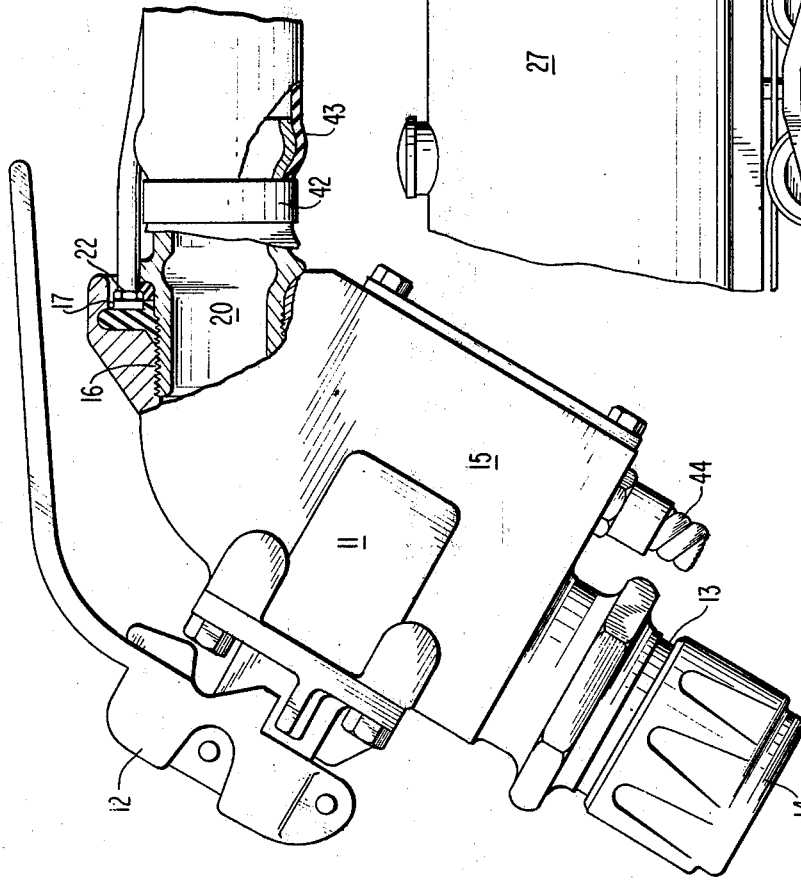
FIG. 2 is a diagrammatic and elevation view of the freight cars interconnected together with the present invention.

This combination of an angle cock, pneumatic hose, and gladhand is currently found on all railroad freight cars in the United States. The combination is attached to either end of the freight car with a train car brake pipe interconnecting the two gladhands through the length of the rail car. FIG. 2 illustrates first and second freight cars 27 and 28 interconnected by means of draft couplings 29 and 30. The brake system for the cars 27 and 28 is interconnected by means of pneumatic hoses 31 and 32, and a pair of gladhands which are "clapsed" together as indicated at 33. After two rail cars are interconnected by means of draft couplings 29 and 30, the brake man steps between the cars, lifts the pneumatic hoses 31 and 32, and interfits the flanges of each gladhand with matching grooves found on the other gladhand and drops the hoses to the position illustrated in FIG. 2. As the hoses are dropped, the ramps 36 and the cam surfaces present on flange 35 lock the two gladhands together to form a pneumatic interconnection. A rubber gasket 37 is also used to assist in the pneumatic interconnection. As the brakeman applies pneumatic pressure to the connection, the air pressure tends to clamp the two gladhands together with approximately 100 lbs. per square inch of pressure.

In the preferred embodiment of the invention, manganese bronze is used to form the gladhands 23. Although it is common practice to construct the gladhands 23 of ferrous metal, the exterior ramp surfaces of which form the electrical interconnection quite often become contaminated with dirt, rust and corrosion which would render them unsuitable as electrical contacts for an extended service life. Since one of the primary objects of the present invention is to provide a durable and trouble-free electrical interconnection between cars, it has been found desirable to use manganese bronze in casting the gladhands 23. This material is relatively inert, and does not form surface oxides in normal use which would impair the conductivity of the mating surfaces. The gladhand 23 is attached to pneumatic hose 18 by means of clamp 39 and ferrule 40.

The other end of the pneumatic hose 18 is equipped with a metallic male threaded connector 20 which is used to threadably engage the threaded female portion 16 of angle cock 11. The pneumatic hose 18 is likewise secured to the male connector 20 by means of clamp 42 and a ferrule 43.

The train line electrical conductor is carried within a conduit 44 as illustrated in FIG. 1. This conduit ends at junction box 15, and, as will be described, is electrically connected to the first contact means 17. Thus it can be seen that if the structure illustrated in FIG. 1 is fitted to each end of a freight car, it will be possible to secure an electropneumatic connection between each of the cars. The electrical interconnection is used as a train line communication system, and is at all times completely insulated from the vehicle body and ground. The return path for the communication system travels from car to car through two separate paths. The first path is from freight car 27 through draft couplers 29 and 30 to freight car 28. The second path is through freight car 27, wheels and wheel truck 45 to rail 46 and from rail 46 to wheels and wheel truck 47 and back to car 28. Since any train line communication system must encompass all working conditions, it is necessary to insure the impedance of the return path be sufficiently low as to not inordinately interfere with the proper functioning of the communication system. It has been found that in a freight car having 200 cars, the impedance path from car to car through the draft couplers 29 and 30 was unacceptably high, and the impedance path through the trucks 45, 47 and rail 46 was also unacceptably high. When combined together as a parallel circuit, as illustrated at FIG. 2, the impedance loss through a 200 freight car train was found to be acceptable.

This train line communication system can be used for a variety of controlling and/or signalling purposes. A representative example of such a train line communication system is found in U.S. Pat. No. 3,545,816 entitled "Electrically-Assisted Automatic Air Brake For Trains", the disclosure of which is incorporated herein by reference.

The preferred embodiment of the electrical contacts and junction box is illustrated in FIGS. 3-5. FIG. 3 is a diagrammatic and partially cross-sectioned view of the angle cock and electrical contacts used in the electropneumatic train line connector. The incoming electrical signal line 50 is an insulated wire conveyed throughout the length of the train through conduit 44. Conduit 44 is secured by means of a threaded connector 51 to a junction box 15 defined by the lower portion of angle cock 11. This junction box is equipped with a central recessed portion 52 defined by upstanding walls 53 and 54 and covered by a cap means 55. Cap means 55 is secured to the body of angle cock 11 by means of threaded bolts 56 and 57. The junction box 15 defines a central terminal 58 which is formed by a bolt insulated from the body of angle cock 11 by a sheet of bakelite 59 or other suitable insulating material. The support for the terminal post 58 is formed by an insulating member 60 which defines an opening 61 and a recessed portion 62 for the terminal post 58. The insulating member 60 is so sized that it is wedged into the interior space 52 defined by the upstanding walls 53 and 54 of the junction box. It is also desirable to form the closure cap 55 out of the same material to insure that the interconnection between the train line 50 and the intermediate conductor 63 is completely insulated from ground on all sides. The conductive portions of conductors 63 and 50 are joined together by means of a pair of copper or other conductive washers 64 and 65 and are secured by means of nut 66.

The intermediate conductor 63 traverses through a cavity 67 defined within the body of angle cock 18 and is connected as illustrated at 68 to the first contact means 17. Contact means 17 and conductor 63 are cast in place within angle cock 11 with a synthetic resin insulator 69. Contact means 17 is thereby held rigidly in place by the resin insulator 69. It defines an annular contact surface 17a described with respect to FIG. 5.

The second contact means 22 is likewise cast into a rigid block of synthetic resin 70 which is resiliently urged or biased towards the first contact means 17 see FIG. 5. The second contact means 22 is secured by solder or through other suitable permanent interconnection to the conductor 21.

The threaded male member 20 is secured to pneumatic hose 18 by virtue of clamp 42 and ferrule 43 and is threadably engaged with angle cock 11 through male threads 71 and female threads 16. These threads are tapered to form a pneumatically secure connection between the angle cock and pneumatic hose 18. Because of the threaded taper, each time the hose is mated to the angle cock, it will be threaded through a different angular rotation as the threads 16 and 71 wedge themselves against one another. The male connecting member 20 also defines a hexagonal flange member 72 (illustrated in FIG. 5) used to tighten the pneumatic hose to the angle cock. The conductor 21 passes through an opening 73 defined in flange 72.

FIG. 5 illustrates an exploded and isometric view of the various components of the electrical contact structure. One of the primary objects of the invention is to insure that an electrical contact is made each time the pneumatic hose 18 is threaded into angle cock 11. To insure this electrical contact, contact 22 is biased outwardly so as to engage the first contact 17 before a pneumatically secure connection is established between hose 18 and angle cock 11. This biasing means is illustrated in FIG. 5. First and second contact means 17 and 22 define annular discs which are adapted to engage one another along their planer surfaces to establish electrical contact. They are formed of copper or other suitable electrically conductive materials. The planar faces of contact means 17 and 22 establish rotatable contacts which will insure electrical contact regardless of the angle of rotation or orientation established between contact means 17 and 22. As was pointed out previously, if pneumatic hose 18 is removed and rethreaded into angle cock 11, the angular orientation of the hose, and consequently contact means 22, will undoubtedly be changed from its first threaded engagement. The first contact means 17 is rigidly secured within a synthetic resin block 69 which is cast in place within the angle cock 11. Thus contact ring 17 is fixed and does not rotate. Its planar surface 17a is free to engage the planar surface of contact means 22 regardless of its angular rotation. The second contact means 22 is likewise cast into a rigid epoxy resin carrier or insulator 70. The contact means 22 is secured to conductor 21 by means of an opening 22b defined within contact means 22. The conductive portion of conductor 21 is soldered or otherwise permanently connected to the contact ring 22 at this point. As illustrated in FIG. 3, the epoxy member 70 is free to reciprocate axially along a "land" portion 20a of threaded member 20. Its limit of reciprocation is established by the hexagonal flange 72 and by snap ring 80. The epoxy member 70 is resiliently urged into contact with snap ring 80 by virtue of a plurality of springs 81, 82 and 83 which are spaced about the annular surface of the epoxy member 70. In addition to the land 20a, the epoxy member 70 is held in proper registration by means of a plurality of pins 84, 85 and 86, which are pinned or otherwise fixably secured to the hexagonal flange as indicated at 34.

Referring to FIG. 5, pin member 84 is illustrated in an exploded view and would normally be wedged or otherwise fixably secured within opening 87 as indicated at 34 in FIG. 3. Referring to FIG. 4, the epoxy member 70 defines a plurality of openings for each of the pins 84–86 and for each of the springs 81–83. Likewise, the flange member 72 defines a plurality of openings 87–88 for the pins and 89–90 for the springs. The pins are fixably secured to flange 72 and are slidably fitted into recessed portions formed in the back of epoxy member 70 as illustrated in FIG. 3. These pins and the land portion 20a provide reciprocating guides for the epoxy member 70. It is biased outwardly by means of springs 81–83 into engagement with snap ring 80. The length of reciprocal travel is set to insure that contact ring 22 is resiliently urged outwardly to engage the first contact ring 17 as the pneumatic hose 18 is threaded into angle cock 18. The electrical connection is established before the pneumatic connection is secured. After electrical contact is made, springs 81–83 are compressed as the entire assembly illustrated in the right hand half of FIG. 5 is rotated. When the pneumatic connection is secured, both the electrical circuit and the pneumatic circuit are secured.

An alternate embodiment of the present invention is illustrated in FIGS. 6 to 8. The angle cock 11, junction box 15, intermediate connector 63, insulating casting 69, and the first contact ring 17 are the same as was previously described with respect to FIGS. 3–5.

The rigid epoxy member 70 has been replaced with the elastomeric and compressible carrier member 90 illustrated in FIGS. 7 and 8. Elastomeric member 90 carries the second contact means 22 within a recessed portion formed in one annular surface. The second annular surface has formed therein a plurality of voids 92 which allow the member 90 to be compressed as the male member 20 is threaded into engagement with the threaded portion 16 of angle cock 11. The elastomeric member 90 is backed by flange member 72 formed on the male adapter 20. The conductor 21 passes through an opening 73 formed in the flange member 72 and is soldered, or otherwise permanently connected to contact member 22 as indicated at 93.

As was previously described with respect to FIGS. 3–5, the contact ring 22 is spaced outwardly from flange member 72 and is resiliently biased in that direction by the compressibility of elastomeric member 90. As the pneumatic hose 18 and threaded coupling 20 are threadably engaged with the body of angle cock 11, the contact rings 17 and 22 will engage each other along their annular faces. In this way, electrical contact is insured before a pneumatic connection is secured between male member 20 and angle cock 11. As member 20 is rotated or threaded into threaded portion 16, the elastomeric member 90 compresses and is deformed into position illustrated in FIG. 6.

While specific means have been illustrated in specific embodiments described in detail above, it is to be understood that various modifications of component parts and their interaction thereof would occur to one skilled in the art. Accordingly, it is understood that the present invention is not limited to these illustrations and examples, but is to be limited only in accordance with the appended claims.

We claim:

1. An electropneumatic connector for a train signal line and pneumatic brake pipe, said connector comprising:

a brake pipe angle cock adapted to be mounted on a rail vehicle at the end of said brake pipe;

a non conductive brake pipe hose having first and second ends;

an electrically conductive pneumatic coupler attached to the first end of said nonconductive hose, for providing electrical and pneumatic coupling between said hose and a similar hose from another train car;

first contact means mounted on and insulated from said angle cock for receiving signals from said train line;

second contact means mounted on the second end of said nonconductive hose;

conductor means traversing the length of said hose for electrically connecting said pneumatic coupler with said second contact means; and means joining said angle cock and said nonconductive hose for making electrical contact between said first and second contact means and pneumatic contact between the second end of said nonconductive hose and said angle cock during the connecting of said nonconductive hose to said angle cock, regardless of the angular orientation between said angle cock and said nonconductive hose.

2. An electropneumatic conductor for a trainline brake pipe as claimed in claim 1 wherein
   a. said brake pipe hose threadably engages said angle cock,
   b. said first and second electrical contact means comprise rotatable contacts.

3. An electropneumatic connection for a train line brake pipe as claimed in claim 2 wherein said rotatable contacts are annular discs that abut one another around their planar faces.

4. An electropneumatic connector for a train line brake pipe as claimed in claim 3 wherein at least one of the annular discs includes resilient biasing means for urging the disc into engagement with the other disc before said threaded connection is pneumatically secured.

5. An electropneumatic connector for a train line brake pipe as claimed in claim 4 wherein said resilient biasing means comprises a plurality of guide pins and at least one spring means.

6. An electropneumatic connector for a train line brake pipe as claimed in claim 4 wherein said resiliently biased contact means is embedded in a resilient elastomeric ring.

7. An electropneumatic connector for a train line brake pipe as claimed in claim 1 wherein
   a. said brake pipe hose threadably engages said angle cock,
   b. at least one of said electrical contact means including a resilient biasing means adapted to urge said contact into engagement with said other electrical contact means before said threaded coupling is pneumatically secured.

8. An electropneumatic connector for a train line brake pipe as claimed in claim 7 wherein said electrical contacts comprise annular discs that rotatably engage one another as said threaded coupling is pneumatically secured.

9. An electropneumatic connector for a train line brake pipe as claimed in claim 8 wherein said resilient biasing means comprises a plurality of guide pins and at least one spring means.

10. An electropneumatic connector for a train line brake pipe as claimed in claim 1 wherein said angle cock further defines a junction box for securing a train line control wire to said second electrical contact.

* * * * *